US011101521B2

(12) United States Patent
You et al.

(10) Patent No.: US 11,101,521 B2
(45) Date of Patent: *Aug. 24, 2021

(54) BATTERY MODULE AND BATTERY PACK

(71) Applicant: CONTEMPORARY AMPEREX TECHNOLOGY CO., LIMITED, Ningde (CN)

(72) Inventors: Kaijie You, Ningde (CN); Xingdi Chen, Ningde (CN); Linggang Zhou, Ningde (CN); Peng Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,143

(22) Filed: Jul. 10, 2019

(65) Prior Publication Data
US 2020/0287181 A1    Sep. 10, 2020

(30) Foreign Application Priority Data

Mar. 7, 2019  (CN) .......................... 201910173001.1

(51) Int. Cl.
*H01M 50/20*  (2021.01)
*H01M 10/04* (2006.01)
(Continued)

(52) U.S. Cl.
CPC ....... *H01M 50/20* (2021.01); *H01M 10/0481* (2013.01); *H01M 50/502* (2021.01); *H01M 50/538* (2021.01); *H01M 50/54* (2021.01)

(58) Field of Classification Search
None
See application file for complete search history.

(56) References Cited

U.S. PATENT DOCUMENTS

2013/0224537 A1* 8/2013 Choi ................. H01M 10/6563
                                                        429/71
2014/0370367 A1* 12/2014 Higuchi ................ H01M 2/206
                                                        429/158
(Continued)

FOREIGN PATENT DOCUMENTS

| EP | 3249717 A1 | 11/2017 |
| JP | 2016009646 A | 1/2016 |
| JP | 2017216200 A | 12/2017 |

OTHER PUBLICATIONS

Ryota et al. (JP, 2017216200) (a raw machine translation) (Abstract) (Dec. 17, 2017) (Year: 2017).*

(Continued)

*Primary Examiner* — Carmen V Lyles-Irving
(74) *Attorney, Agent, or Firm* — Suiter Swantz pc llo

(57) ABSTRACT

The present disclosure relates to a battery module including a plurality of battery unit array structures, a first cover body and a second cover body connected to the first cover body. The battery unit array structures are arranged between the first cover body and the second cover body. The first cover body includes a first carrying portion and a second carrying portion being in a split structure. The plurality of battery unit array structures includes a first battery unit array structure and a second battery unit array structure. The first battery unit array structure is disposed opposite to the first carrying portion, and the second battery unit array structure is disposed opposite to the second carrying portion. Compared with the related art, the first cover body is used for transportation in the present disclosure, and the energy density of the battery module can be improved without an additional component.

12 Claims, 12 Drawing Sheets

(51) Int. Cl.
    *H01M 50/54*     (2021.01)
    *H01M 50/502*     (2021.01)
    *H01M 50/538*     (2021.01)

(56) References Cited

U.S. PATENT DOCUMENTS

| | | | |
|---|---|---|---|
| 2018/0145287 A1 | 5/2018 | Lange et al. | |
| 2019/0245185 A1* | 8/2019 | Ishihara | H01M 10/425 |
| 2020/0303695 A1* | 9/2020 | Chen | H01M 2/1077 |

OTHER PUBLICATIONS

Ryota et al. (JP, 2017216200) (a raw machine translation) (Detailed Description) (Dec. 17, 2017) (Year: 2017).*
Ryota et al. (JP, 2017216200) (a raw machine translation) (Drawings) (Dec. 17, 2017) (Year: 2017).*
Office Action dated Jan. 3, 2020 for EP Patent Application No. 19183018.

\* cited by examiner

BATTERY MODULE AND BATTERY PACK

CROSS-REFERENCE TO RELATED APPLICATIONS

The present application claims priority to Chinese Patent Application No. 201910173001.9, filed on Mar. 7, 2019, the content of which is incorporated herein by reference in its entirety.

TECHNICAL FIELD

The present disclosure relates to the technical field of battery, and in particular, relates to a battery module and a battery pack.

BACKGROUND

The secondary battery has been widely used in various fields such as new energy vehicles and energy storage power stations, due to its advantages of high energy density, long service life, energy saving, environmental protection and the like.

A battery module includes a battery unit array structure, a busbar, an upper cover and a lower cover. The battery unit array structure includes a plurality of battery units and a plurality of busbars electrically connected to the plurality of battery units. The battery unit array structure is accommodated in an accommodating cavity enclosed by the upper cover and the lower cover. When assembling the battery module, if the battery unit array structure is first formed by fixing the plurality of battery units and connecting them to the plurality of busbars and then transported to the accommodating cavity, an additional component for the transportation is required to be provided on the battery unit array structure, which reduces the energy density of the battery module.

In this regard, when assembling the battery module, the plurality of battery units is first sequentially accommodated in the accommodating cavity and fixed and then connected to the plurality of busbars. However, if the battery module includes a plurality of battery unit array structures and a distance between the plurality of battery unit array structures is relatively small, there is no operating space remained for the tool for connecting the busbars, and thus it is extremely difficult to connect the busbars

SUMMARY

In view of above, the present disclosure provides a battery module and a battery pack, aiming to solve the technical problems in the related art.

According to a first aspect of the present disclosure, a battery module is provided. The battery module includes: a plurality of battery unit array structures, each of the plurality of battery unit array structures including a plurality of battery units and a plurality of busbars electrically connected to the plurality of battery units; a first cover body; and a second cover body. The first cover body is connected to the second cover body, and the plurality of battery unit array structures is arranged between the first cover body and the second cover body. The first cover body includes a first carrying portion and a second carrying portion, and the first carrying portion and the second carrying portion is in a split structure. The plurality of battery unit array structures includes a first battery unit array structure and a second battery unit array structure. The first battery unit array structure is disposed opposite to the first carrying portion, and the second battery unit array structure is disposed opposite to the second carrying portion.

As a preferable structure according to the present disclosure, each of the plurality of battery units includes a battery casing, a cover plate, and electrode terminals, the cover plate is connected to the battery casing, and the electrode terminals are provided on the cover plate and electrically connected to the plurality of busbars; the electrode terminals of the first battery unit array structure face towards or away from the second battery unit array structure, and/or the electrode terminals of the second battery unit array structure face towards or away from the first battery unit array structure.

As a preferable structure according to the present disclosure, the first carrying portion includes a first carrying surface disposed vertically, the first carrying surface is located at a side of the first battery unit array structure facing away from the second battery unit array structure, and the electrode terminals of the first battery unit array structure face towards the second battery unit array structure; and/or the second carrying portion includes a second carrying surface disposed vertically, the second carrying surface is located at a side of the second battery unit array structure facing away from the first battery unit array structure, and the electrode terminals of the second battery unit array structure face towards the first battery unit array structure.

As a preferable structure according to the present disclosure, each of the plurality of battery units further includes an electrode assembly accommodated in a battery casing, and the electrode assembly includes a first electrode plate, a second electrode plate, and a separator disposed between the first electrode plate and the second electrode plate. The electrode assembly is in a wound structure, and outer surfaces of the electrode assembly includes two flat surfaces facing to each other in a vertical direction; or the electrode assembly is in a layered structure, in which the first electrode plate, the separator and the second electrode plate are stacked in the vertical direction.

As a preferable structure according to the present disclosure, the plurality of battery unit array structures includes three or more battery unit array structures including a third battery unit array structure, and the third battery unit array structure is disposed between the first battery unit array structure and the second battery unit array structure. The first cover body further includes a third carrying portion, and the third battery unit array structure is disposed opposite to the third carrying portion.

As a preferable structure according to the present disclosure, the third carrying portion has one end fixed to the first carrying portion and another end fixed to the second carrying portion.

As a preferable structure according to the present disclosure, the first carrying portion and/or the second carrying portion are glued to the plurality of battery unit array structures.

As a preferable structure according to the present disclosure, the first carrying portion and the second carrying portion are connected by welding, riveting or bonding.

As a preferable structure according to the present disclosure, the battery module further includes a fixing component. The first carrying portion is connected to the second carrying portion through the fixing component.

As a preferable structure according to the present disclosure, the fixing component is a cooling plate. The first carrying portion and the second carrying portion are respectively connected to the fixing component with heat-conducting glue.

As a preferable structure according to the present disclosure, the first cover body further includes a first fixing portion and a second fixing portion, the first fixing portion is connected to the first carrying portion and extends in a direction facing away from the second battery unit array structure, and the second fixing portion is connected to the second carrying portion and extends in a direction facing away from the first battery unit array structure. The second cover body includes a main plate, a third fixing portion and a fourth fixing portion, and the third fixing portion and the fourth fixing portion are respectively connected to two ends of the main plate. The first fixing portion is disposed opposite and fixed to the third fixing portion, and the second fixing portion is disposed opposite and fixed to the fourth fixing portion.

As a preferable structure according to the present disclosure, the battery module further includes a collecting plate. The collecting plate is vertically disposed and connected to the electrode terminals of each of the plurality of battery units.

Different from the related art, the first cover body includes the first carrying portion and the second carrying portion that are in a split structure. Therefore, the plurality of battery units can be first placed on and fixed to the first carrying portion sequentially, then connected to the plurality of busbars, and transported by means of the first carrying portion. The plurality of battery units can be sequentially placed on the second carrying portion in the same way. In this case, as the first cover body can be used for transportation, it is unnecessary to introduce an additional component, thereby enhancing the energy density of the battery module.

In order to solve the above problems, according to a second aspect of the present disclosure, a battery pack is provided. The battery pack includes an accommodating box, and a plurality of battery modules accommodated in the accommodating box. One of the plurality of battery modules is the battery module according to the first aspect.

As a preferable structure according to the present disclosure, the first cover body includes a first fixing portion and a second fixing portion, the first fixing portion is connected to the first carrying portion, and the second fixing portion is connected to the second carrying portion. The second cover body includes a main plate, a third fixing portion and a fourth fixing portion, and the third fixing portion and the fourth fixing portion are respectively connected to two ends of the main plate. The accommodating box includes a box cover and a box body, the box body is provided with a first fixing beam and a second fixing beam, and the first fixing beam and the second fixing beam protrude from a surface of the box body. The first fixing portion, the third fixing portion and the first fixing beam are disposed opposite to one another, and the first fixing portion and the third fixing portion are fixed to the first fixing beam. The second fixing portion, the fourth fixing portion and the second fixing beam are disposed opposite to each other, and the second fixing portion and the fourth fixing portion are fixed to the second fixing beam.

As a preferable structure according to the present disclosure, the battery pack further includes a plurality of pressing bars. The first fixing portion and the third fixing portion are pressed between one of the plurality of pressing bars and the first fixing beam, and the second fixing portion and the fourth fixing portion are pressed between one of the plurality of pressing bars and the second fixing beam.

Different from the related art, the first cover body includes the first carrying portion and the second carrying portion that are in a split structure. Therefore, the plurality of battery units can be first placed on and fixed to the first carrying portion sequentially, then connected to the plurality of busbars, and transported by means of the first carrying portion. The plurality of battery units can be placed sequentially on the second carrying portion in the same way. In this case, as the first cover body can be used for transportation, it is unnecessary to introduce an additional component, thereby enhancing the energy density of the battery module.

Figure 1:
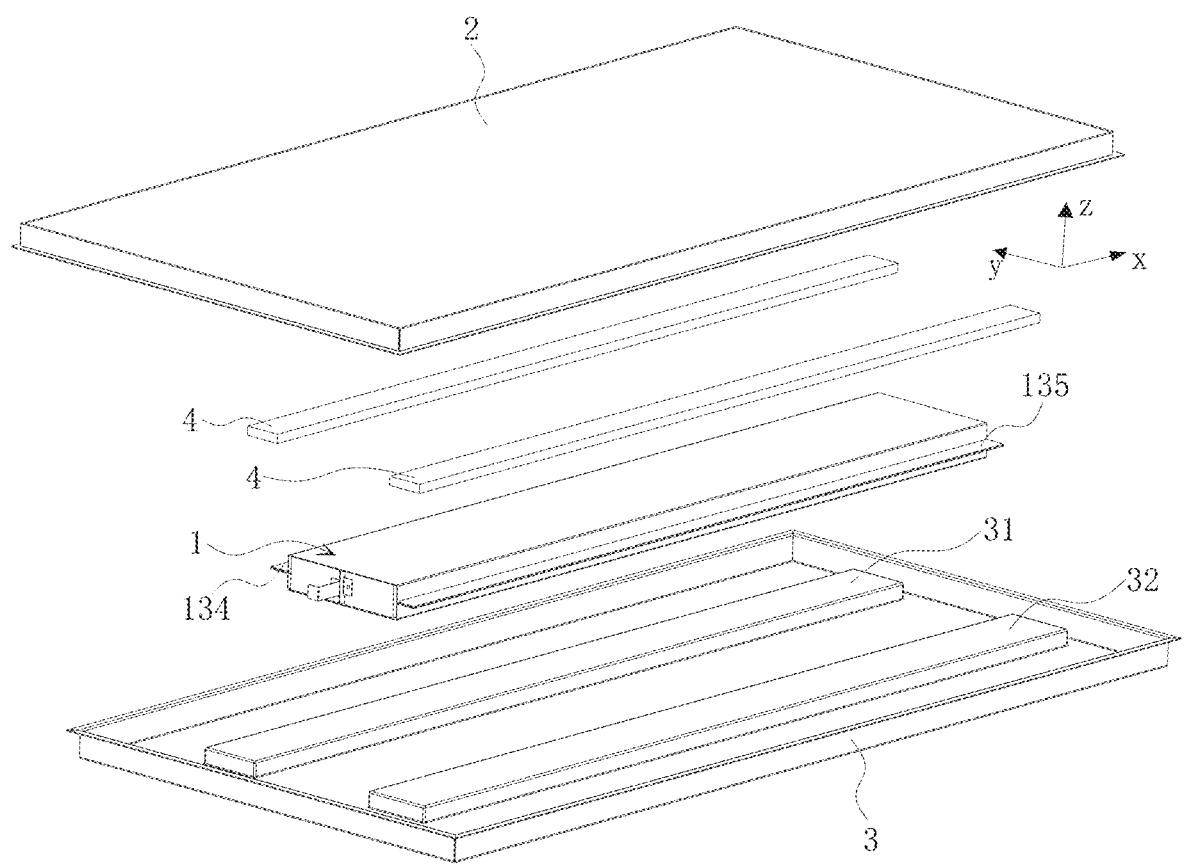
FIG. 1 is an exploded view of a battery pack according to a specific embodiment.

REFERENCE NUMERALS 1. battery module
10 battery unit array structure
101 first battery unit array structure
102 second battery unit array structure
103 third battery unit array structure
11 battery unit
111 battery assembly
1111 first electrode plate
1112 second electrode plate
1113 separator
1114 flat surface
112 battery casing
1121 first surface
1122 second surface
113 electrode terminal connector 114 cover plate
115 electrode terminal
116 vent
12 busbar
13 first cover body
131 first carrying portion
1311 first carrying surface
132 second carrying portion
1321 second carrying surface
133 third carrying portion
134 first fixing portion
135 second fixing portion
14 second cover body
140 main plate
141 third fixing portion
142 fourth fixing portion
15 collecting plate
16 end plate
17 fixing component
2 box cover
3 box body
31 first fixing beam
32 second fixing beam
4 pressing bar

DESCRIPTION OF EMBODIMENTS

The technical solutions will be described in detail below with reference to specific embodiments and accompanying drawings in term of technical content, structural features, and objects and effects.

The terms "first", or "second" in the description are used for a purpose of description only, but not intended to indicate or imply relative importance thereof. Unless otherwise specified or stated, term "a plurality of" means two or more, terms "connected", "fixed", etc. shall be understood in a broad sense. For example, the term "connected" includes various connection manners, such as fixed connection, detachable connection, integrated connection, electrical connection, direct connection or indirect connection via an intermediate medium. These skilled in the art are able to understand specific meanings of the above terms in accordance with specific circumstances.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 2:
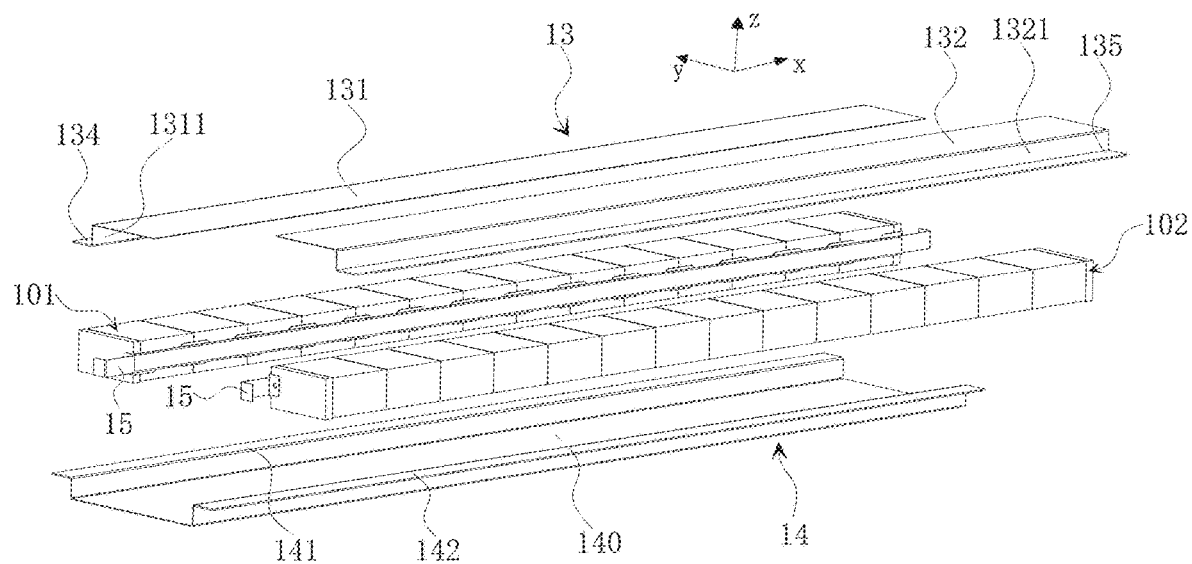
FIG. 2 is an exploded view of two battery unit array structures according to a first embodiment.

FIG. 1 and FIG. 2 illustrate a battery pack according to an embodiment. The battery pack includes an accommodating box and a plurality of battery modules 1 disposed in the accommodating box. The plurality of battery modules 1 can be arranged either along a horizontal direction (a length direction indicated by arrow x or a width direction indicated by arrow y), or along a vertical direction (a direction indicated by arrow z).

In an example, the accommodating box includes a box cover 2 and a box body 3. A plurality of first fixing beams 31 and a plurality of second fixing beams 32 are provided on the box body 3. The first fixing beam 31 is substantially parallel to the second fixing beam 32.

In the present embodiment, the first fixing beam 31 and the second fixing beam 32 can be protruding beams that protrude upwards from the bottom of the box body 3, or act as separate components that are welded on the bottom of the box body 3. In addition, in other embodiments, the first fixing beam 31 and the second fixing beam 32 also can be provided on the box cover 2.

The battery pack further includes pressing bars 4. The pressing bars 4 press both ends of the battery module 1 against the first fixing beam 31 and the second fixing beam 32, so as to fix the battery module 1 to the box body 3. In this case, the battery module 1 is fixed by the pressing bars 4.

In the present embodiment, a first fixing portion 134, a third fixing portion 141, and a first fixing beam 31 are disposed opposite to one another, and the second fixing portion 135, the fourth fixing portion 142, and the second fixing beam 32 are disposed opposite to each other. The third fixing portion 141 is located below the first fixing portion 134, and the fourth fixing portion 142 is located below the second fixing portion 135.

As shown in FIG. 1, the first fixing portion 134 and the third fixing portion 141 are tightly pressed between the pressing bar 4 and the first fixing beam 31 to fix one end of the battery module 1 to the box body 3. The second fixing portion 135 and the fourth fixing portion 142 are tightly pressed between the pressing bar 4 and the second fixing beam 32 to fix the other end of the battery module 1 to the box body 3. It should be noted that the fixing of the battery module 1 to the box body 3 is not limited to the manner using the pressing bars 4 as described in the present embodiment, and it can also adopt bolts, welding, riveting or the like fixing manner.

Figure 5:
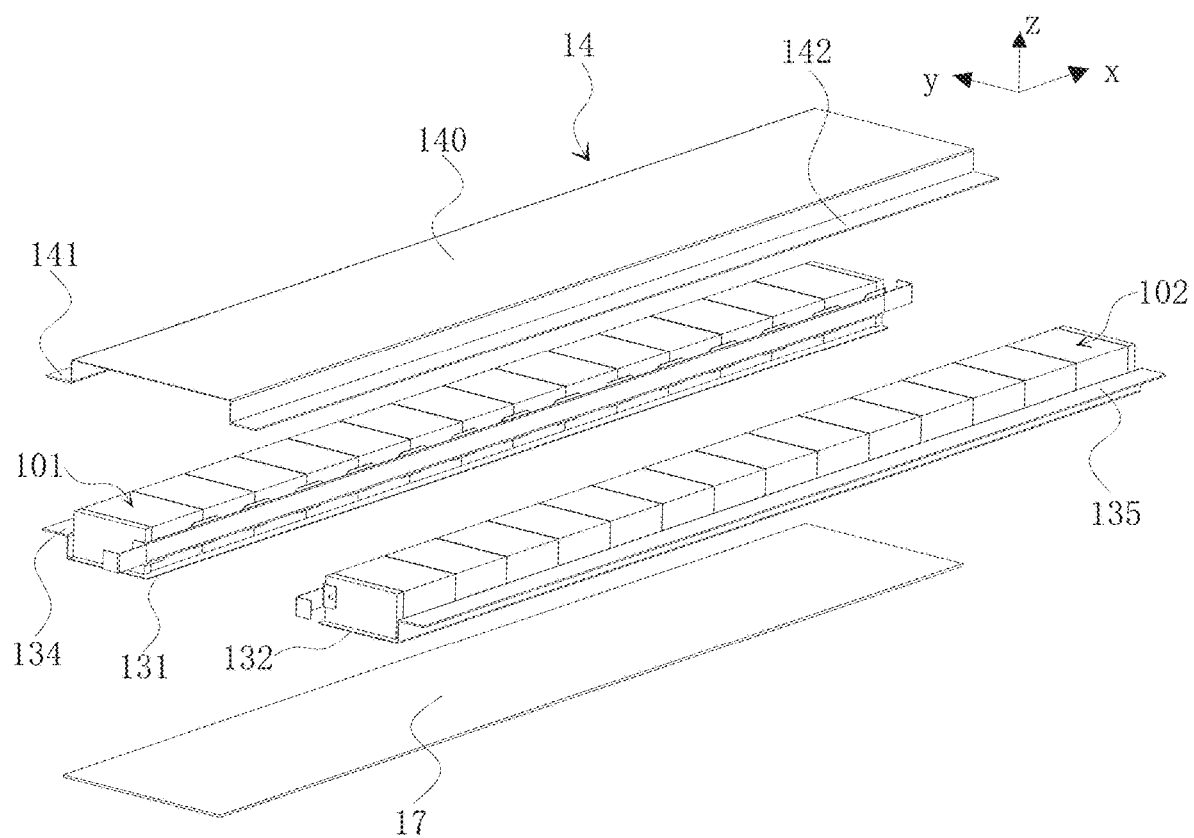
FIG. 5 is an exploded view of the battery module according to the first embodiment with a fixing component.
Figure 6:
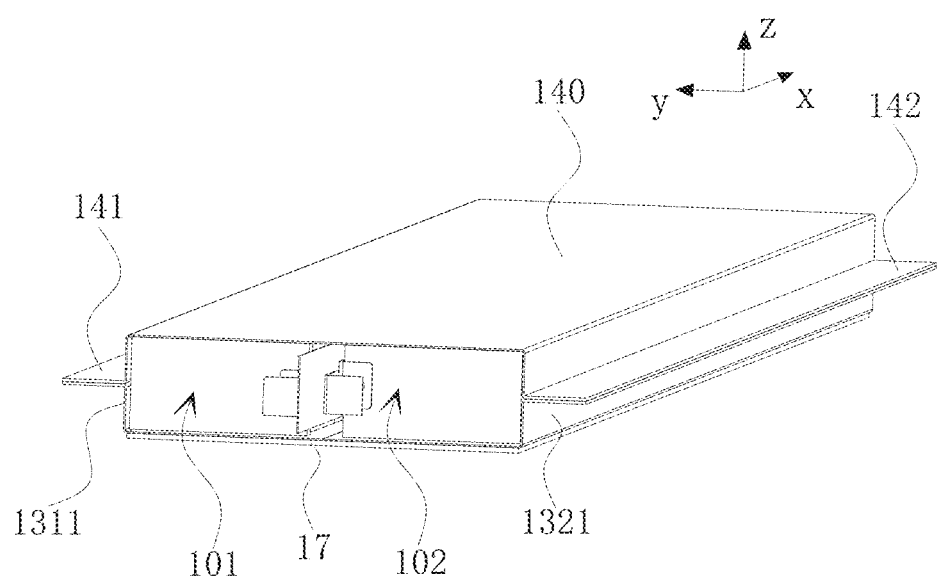
FIG. 6 is a schematic assembled diagram of the battery module according to the first embodiment with the fixing component.

In the embodiment as shown in FIG. 2, the battery module 1 includes battery unit array structures 10, a first cover body 13 and a second cover body 14. The battery unit array structures 10 are disposed between the first cover body 13 and the second cover body 14. The first cover body 13 includes a first carrying portion 131 and a second carrying portion 132. The first carrying portion 131 and the second carrying portion 132 are in a split structure. The first carrying portion 131 is fixed to one end of the second cover body 14, and the second carrying portion 132 is fixed to the other end of the second cover body 14. In the embodiment as shown in FIG. 2 to FIG. 4 and FIG. 7 to FIG. 8, the first cover body 13 is disposed above the second cover body 14. In the embodiment as shown in FIG. 5 to FIG. 6, the first cover body 13 is disposed below the second cover body 14.

The first cover body 13 further includes a first fixing portion 134 and a second fixing portion 135. The first fixing portion 134 is connected to the first carrying portion 131 and extends in a direction facing away from the second battery unit array structure 102. The second fixing portion 135 is connected to the second carrying portion 132 and extends in a direction facing away from the first battery unit array structure 101. The second cover body 14 includes a main plate 140, a third fixing portion 141 and a fourth fixing portion 142. The third fixing portion 141 and the fourth fixing portion 142 are respectively connected to two ends of the main plate 140, and extend in a direction facing away from the main plate 140.

The first carrying portion 131 and the second carrying portion 132 are in a split structure. The split structure mentioned herein means that the first carrying portion 131 and the second carrying portion 132 of the first cover body 13 are not manufactured with the same sheet material. That is, the first carrying portion 131 and the second carrying portion 132 are two separate components. After the battery module 1 is assembled, the first carrying portion 131 and the second carrying portion 132 are connected to one another or are not connected to one another. In the present embodiment, the first carrying portion 131 and the second carrying portion 132 are configured to carry the battery unit array structure 10, respectively.

During the assembling process of the battery module 1, the plurality of battery units 11 of the battery unit array structure 10 is sequentially placed on and fixed to the first carrying portion 131, then connected to a plurality of busbars 12, and transported by means of the first carrying portion 131.

In another example, the plurality of battery units 11 of the battery unit array structure 10 is sequentially placed on and fixed to the second carrying portion 132, then connected to a plurality of busbars 12, and then transported by means of the second carrying portion 132.

In this case, since the first cover body 13 can be used for transportation, it is unnecessary to introduce an additional component, thereby enhancing the energy density of the battery module 1.

In the first embodiment as shown in FIG. 2 to FIG. 6, the battery module 1 includes two battery unit array structures 10. One of the two battery unit array structures 10 is a first battery unit array structure 101, and the other one of the two battery unit array structures 10 is a second battery unit array structure 102. The first battery unit array structure 101 is disposed opposite to the first carrying portion 131, and the second battery unit array structure 102 is disposed opposite to the second carrying portion 132.

A length and a width of the first carrying portion 131 extending in the horizontal direction (the length direction indicated by arrow x or the width direction indicated by arrow y) are approximately equal to a length and a width of the first battery unit array structure 101 extending in the horizontal direction, respectively. Similarly, a length and a width of the second carrying portion 132 extending in the horizontal direction (the length direction indicated by arrow x or the width direction indicated by arrow y) are approximately equal to a length and a width of the second battery unit array structure 102 extending in the horizontal direction, respectively.

It should be understood that, the length and the width of the first carrying portion 131 as well as the length and the width of the second carrying portion 132 are not limited to the above embodiment. It is also possible that the length of the first carrying portion 131 is greater or smaller than the length of the first battery unit array structure 101, and the width of the first carrying portion 131 is greater or smaller than the width of the first battery unit array structure 101. Similarly, it is also possible that the length of the second carrying portion 132 is greater or smaller than the length of the second battery unit array structure 102, and the width of the second carrying portion 132 is greater or smaller than the width of the second battery unit array structure 102.

Figure 3:
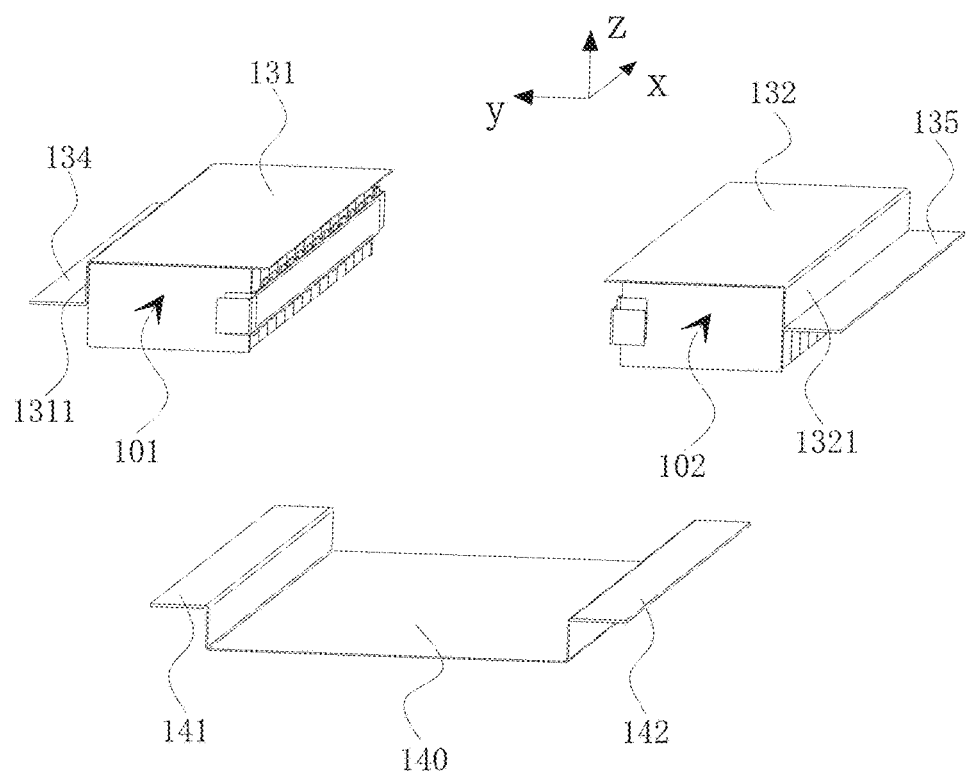
FIG. 3 is a schematic assembled diagram of the two battery unit array structures according to the first embodiment.
Figure 4:
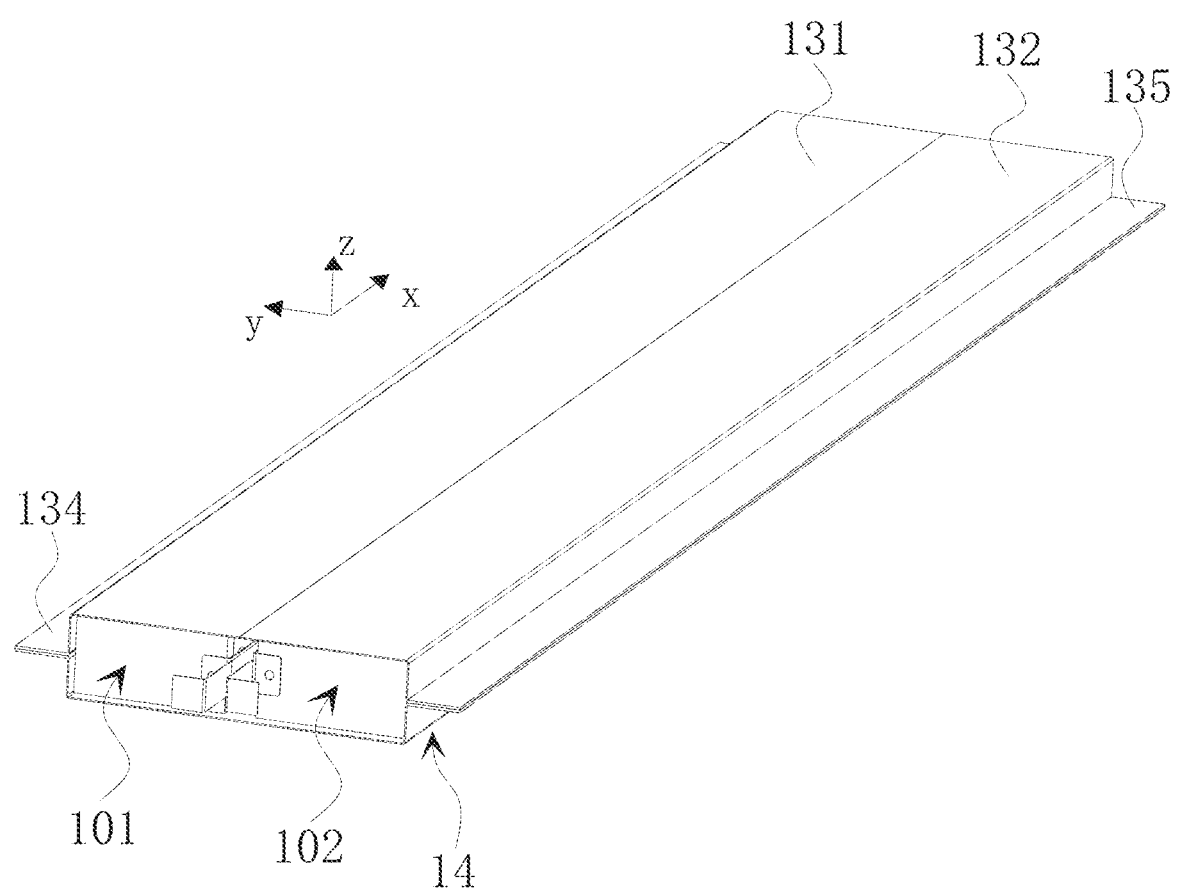
FIG. 4 is a schematic structural diagram of a battery module according to the first embodiment.
Figure 12:
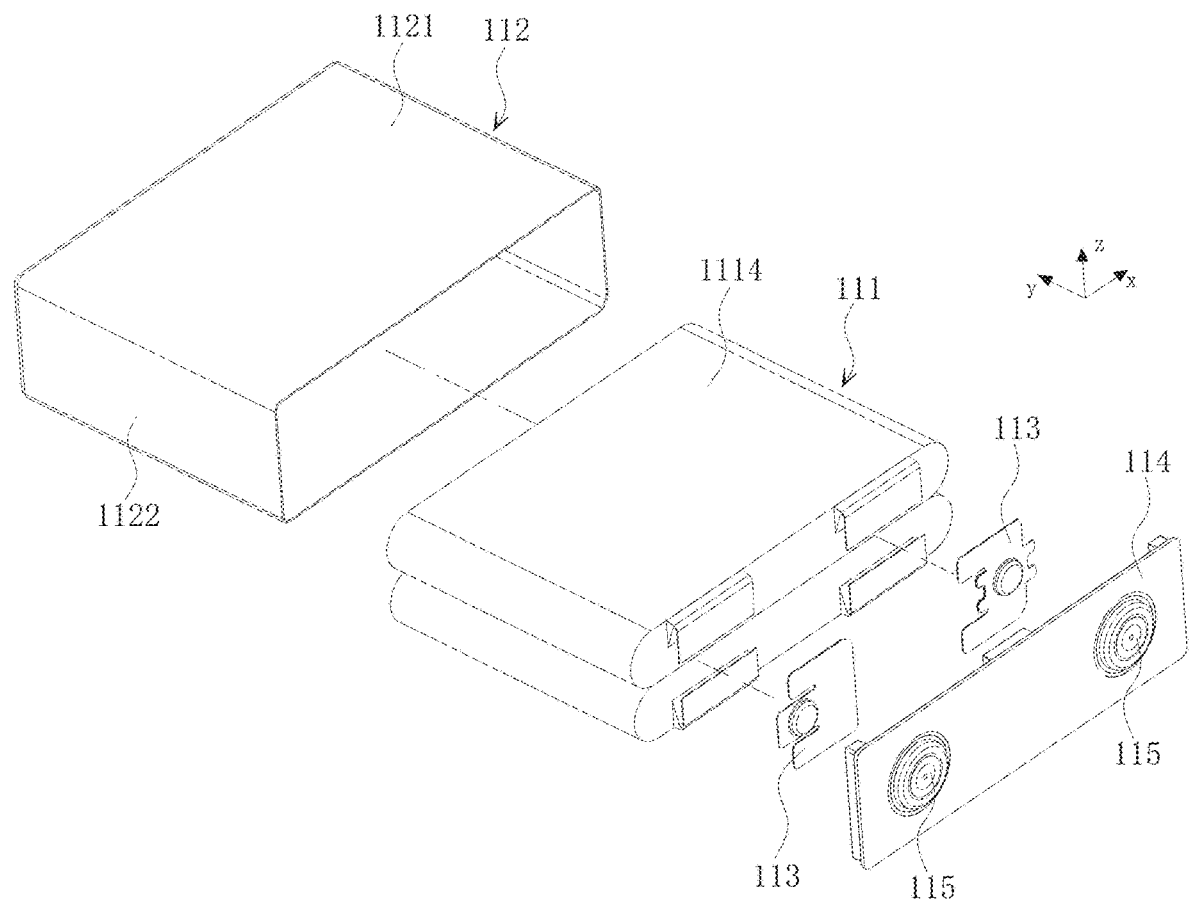
FIG. 12 is an exploded view of a battery unit according to a specific embodiment.

As shown in FIG. 2 to FIG. 4, the first carrying portion 131 includes a first carrying surface 1311 disposed vertically (in the direction indicated by arrow z). The first carrying surface 1311 is located at a side of the first battery unit array structure 101 facing away from the second battery unit array structure 102. The first battery unit array structure 101 has electrode terminals 115, as shown in FIG. 12, facing towards the second battery unit structure 102. The second carrying portion 132 includes a second carrying surface 1321 disposed vertically (in the direction indicated by arrow z). The second carrying surface 1321 is located at a side of the second battery unit array structure 102 facing away from the first battery unit array structure 101. The second battery unit array structure 102 has electrode terminals 115 facing towards the first battery unit structure 101.

In the present embodiment, the electrode terminals 115 of the first battery unit array structure 101 face towards the second battery unit structure 102, while the electrode terminals 115 of the second battery unit array structure 102 face towards the first battery unit array structure 101. In this case, such arrangement facilitates the welding of the busbars 12 of the battery units 11 of the first battery unit array structure 101 and the second battery unit structure 102, and reduces a distance between the electrode terminals 115 of the first battery unit array structure 101 and the electrode terminals 115 of the second battery unit array structure 102, thereby enhancing the energy density of the battery module 1.

As shown in FIG. 5 and FIG. 6, the battery module 1 further includes a fixing component 17. The first carrying portion 131 is connected to the second carrying portion 132 through the fixing component 17.

For example, the fixing member 17 is a cooling plate, and the first carrying portion 131 and the second carrying portion 132 are fixed to the fixing member 17 by heat-conducting glue, respectively. In this case, the fixing member 17 is a cooling plate, and the first carrying portion 131 and the second carrying portion 132 are fixedly connected to the fixing member 17 by a heat-conducting, respectively. In this way, the heat generated by the battery units 11 is transferred to the cooling plate via the first carrying portion 131 (or the second carrying portion 132) and the heat-conducting glue, and thus the battery units 11 are cooled by the cooling plate. It should be noted that the fixing component 17 is not limited to the implement in form of the cooling plate, but can adopt other forms.

Figure 7:
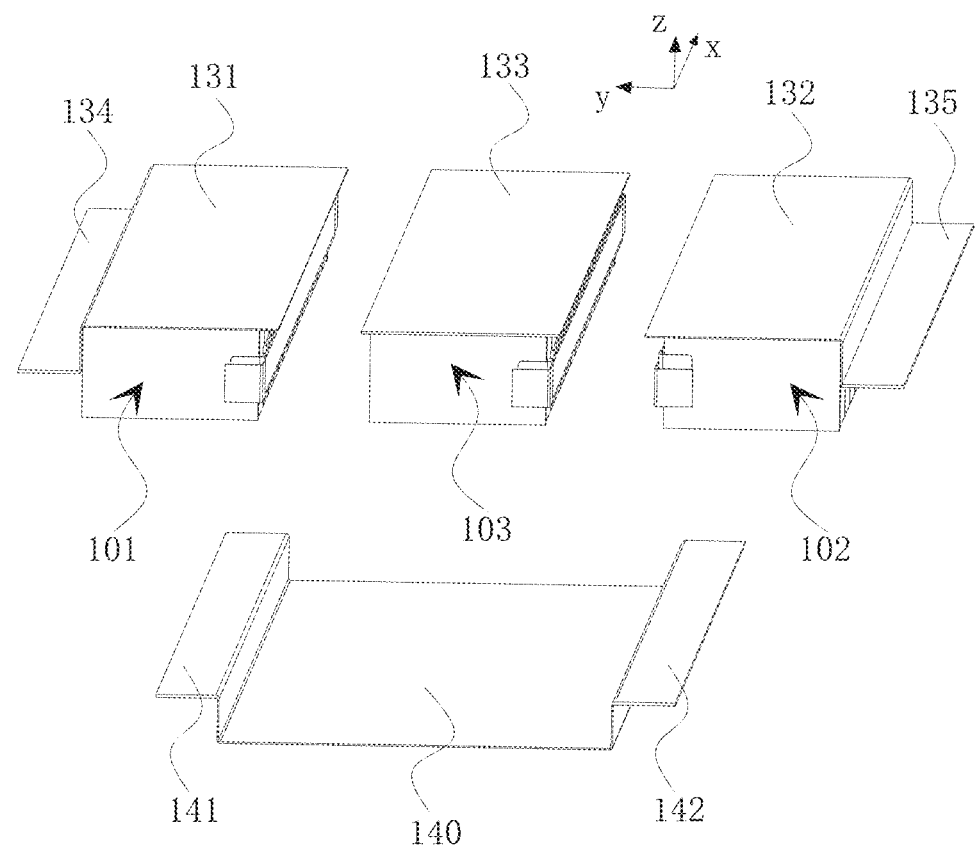
FIG. 7 is a schematic assembled diagram of three battery unit array structures according to a second embodiment.
Figure 8:
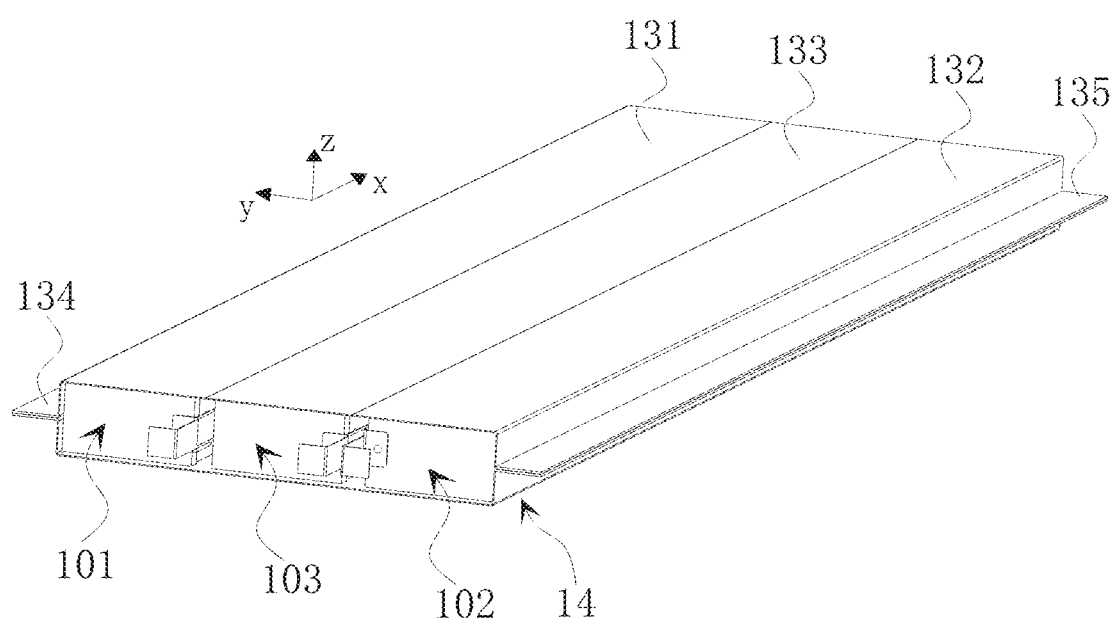
FIG. 8 is a schematic structural diagram of a battery module according to the second embodiment.

In a second embodiment as shown in FIG. 7 to FIG. 8, the battery module 1 includes three battery unit array structures 10, and one of the three battery unit array structures 10 is a third battery unit array structure 103. The third battery unit array structure 103 is disposed between the first battery unit array structure 101 and the second battery unit array structure 102. The first cover body 13 further includes a third carrying portion 133 disposed between the first carrying portion 131 and the second carrying portion 132, and the third battery unit array structure 103 is disposed opposite to the third carrying portion 133.

The battery module 1 is not limit to including only one third battery unit array structure 103, and the battery module 1 can include two or more third battery unit array structures 103. That is, the battery module 1 can include four and more battery unit array structures 10. Correspondingly, the first cover body 13 further includes two or more third carrying portions 133, and each of the third battery unit array structures 103 is disposed opposite to a corresponding third carrying portion 133.

In the embodiment, one end of the third carrying portion 133 is fixed to the first carrying portion 131, and the other end of the third carrying portion 133 is fixed to the second carrying portion 132. In other embodiments, the two ends of the third carrying portion 133 are fixed to the first carrying portion 131 and the second carrying portion 132 via bridging structures, respectively. Both ends of the third carrying portion 133 can be fixed to the first carrying portion 131 and the second carrying portion 132 by welding, riveting or bonding.

In the embodiments, the first carrying portion 131 and/or the second carrying portion 132 are bond to the battery unit array structures 10 by a binder. As an example, the first carrying portion 131 and/or the second carrying portion 132 can be connected to one another by welding, riveting or bonding.

Figure 9:
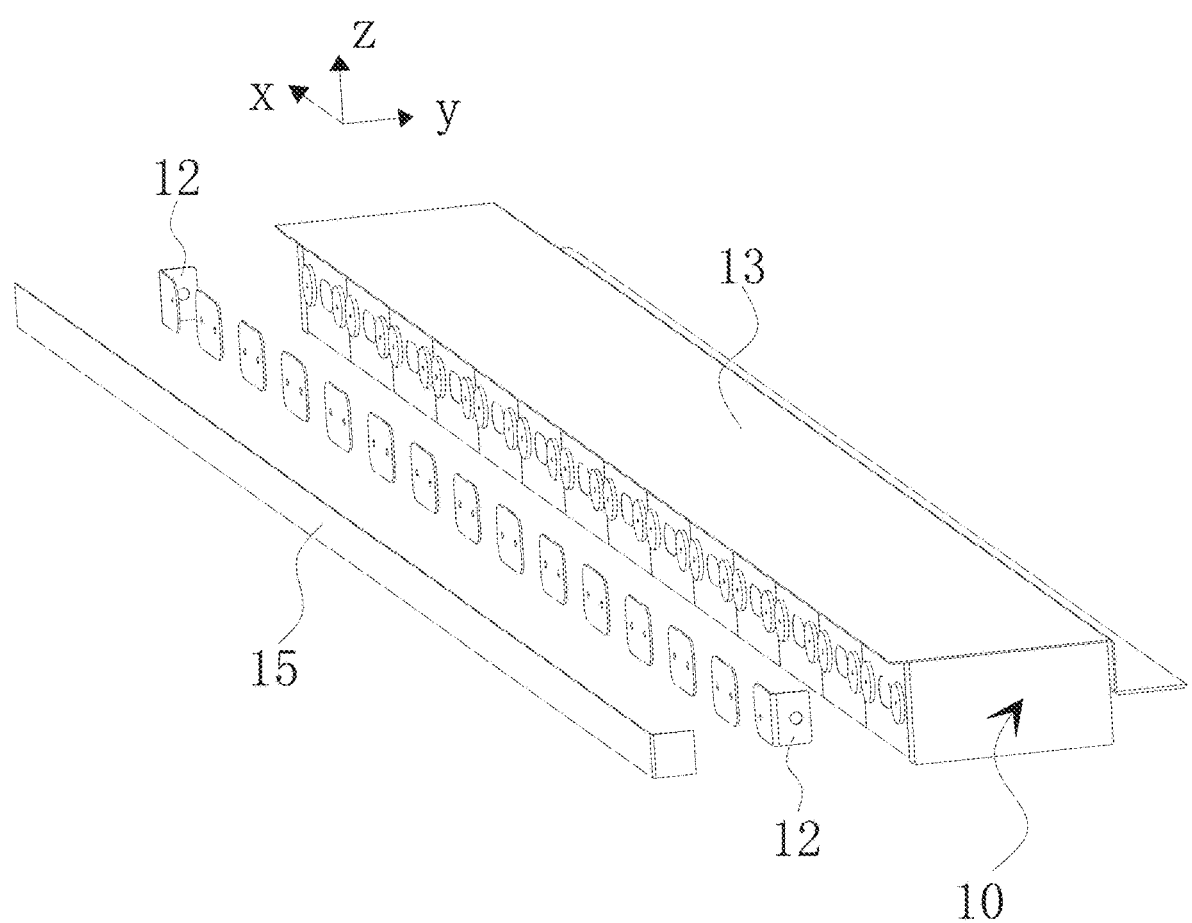
FIG. 9 is an assembled diagram of the battery unit array structure according to a specific embodiment with a first carrying portion.

In the present embodiment as shown in FIG. 9, the plurality of battery units 11 of the battery unit array structure 10 is sequentially placed on and fixed to the first carrying portion 131 of the first cover body 13, then connected to the plurality of busbars 12, and transported by means of the first carrying portion 131. In this case, since the first cover body 13 can be used for transportation, it is unnecessary to introduce an additional component, thereby increasing the energy density of the battery module 1.

Figure 10:
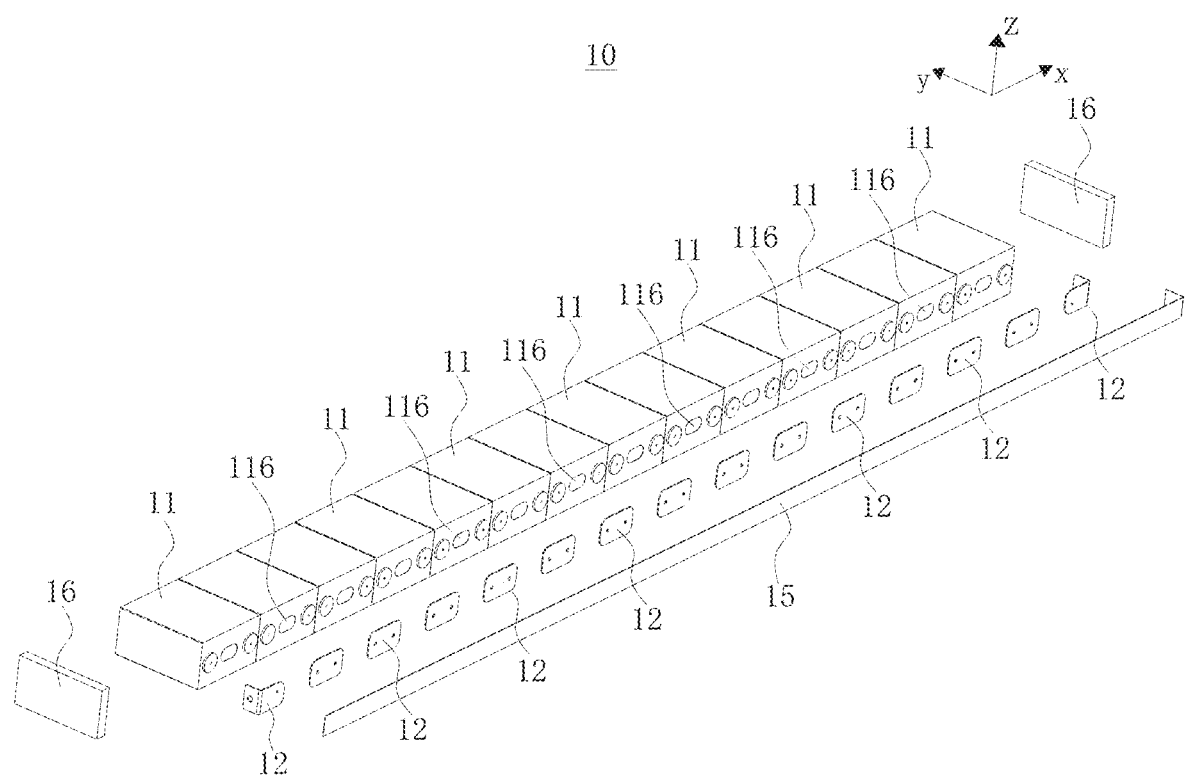
FIG. 10 is an exploded view of a battery unit array structure according to a specific embodiment.
Figure 11:
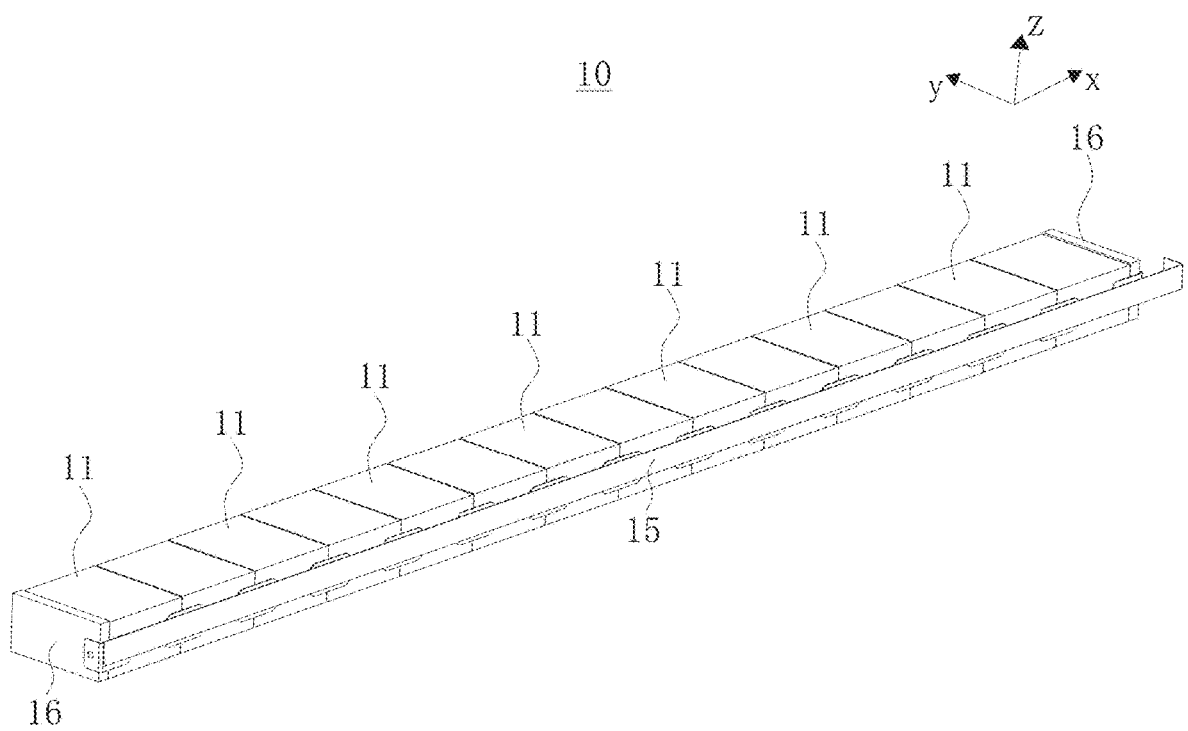
FIG. 11 is a schematic structural diagram of a battery unit array structure according to a specific embodiment.

In the embodiment shown in FIG. 10 and FIG. 11, the battery unit array structure 10 includes a plurality of battery units 11 and a plurality of busbars 12 electrically connected to the plurality of battery units 11. The plurality of battery units 11 is arranged in the horizontal direction (the length direction indicated by arrow x or the width direction indicated by arrow y). A collecting plate 15 is vertically disposed at a side of the battery unit array structure 10, and the collecting plate 15 is connected to the electrode terminals 115 in the battery unit array structure 10.

In the present embodiment, the battery unit array structure 10 further includes two end plates 16, and the two end plates 16 are respectively located at two ends of the plurality of battery units 11 in the horizontal direction (the length direction indicated by arrow x or the width direction indicated by arrow y).

In a specific embodiment, a side surface of the battery unit 11 is applied with glue and is bonded to an adjacent battery unit 11. The plurality of battery units 11 is provided with the end plates 16 at the two ends, and the plurality of battery units 11 is bonded to the end plates 16 by glue. The plurality of battery units 11 is electrically connected to one another via the busbars 1S2.

As shown in FIG. 12, the battery unit 11 includes an electrode assembly 111, a battery casing 112, electrode terminal connectors 113, a cover plate 114, and electrode terminals 115. The battery casing 112 can have a hexahedral shape or any other shape. The battery casing 112 has an inner space for accommodating the electrode assembly 111 and the electrolyte, and an opening. The electrode assembly 111 is accommodated in the battery casing 112, the cover plate 114 covers the opening and configured to enclose the electrode assembly 111 in the battery casing 112, and the electrode assembly 111 is electrically connected to the electrode terminals 115 through the electrode terminal connectors 113. In the present embodiment, there are two electrode terminal connectors 113, i.e., a positive terminal connector 113 and a negative terminal connector 113. The battery casing 112 can be made of a material such as aluminum, aluminum alloy, or plastic.

The electrode assembly 111 is accommodated in the battery casing 112 and includes a first electrode plate 1111, a second electrode plate 1112, and a separator 1113 disposed between the first electrode plate 1111 and the second electrode plate 1112. The first electrode plate 1111 is a positive electrode plate or a negative electrode plate, and the second electrode plate 1112 has opposite polarity to the first electrode plate 1111, i.e., the second electrode plate 1112 is a negative electrode plate or a positive electrode plate. The separator 1113 is an insulator interposed between the first electrode plate 1111 and the second electrode plate 1112. The electrode assembly 111 can be in form of a wound structure (as shown in FIG. 13) or a layered structure (as shown in FIG. 14).

For purpose of illustration, the first electrode plate 1111 is a positive electrode plate and the second electrode plate 1112 is a negative electrode plate. In other embodiments, it is also possible that the first electrode plate 1111 is a negative electrode plate and the second electrode plate 1112 is a positive electrode plate. In addition, a positive electrode active material is coated on a coating region of the positive electrode plate, and a negative electrode active material is coated on a coating region of the negative electrode plate. An uncoated region extending from each coating region acts as a tab. The electrode assembly 111 includes two tabs, i.e., a positive tab and a negative tab. The positive tab extends from the coating region of the positive electrode plate, and the negative tab extends from the coating region of the negative electrode plate. The positive electrode tab is electrically connected to the positive electrode terminal 115 through the positive electrode terminal connector 113, and the negative electrode tab is electrically connected to the negative electrode terminal 115 through the negative electrode terminal connector 113.

The battery casing 112, in an approximately hexahedral form, includes two first surfaces 1121 and two second surfaces 1122. Each of the first surfaces 1121 has a larger area than each of the second surfaces 1122. In the battery module 1, the two second surfaces 1122 of each battery unit 11 face to each other in the horizontal direction (for example, the length direction indicated by arrow x), and the two first surfaces 1121 of each battery unit 11 face to each other in the vertical direction (the direction indicated by arrow z).

Figure 13:
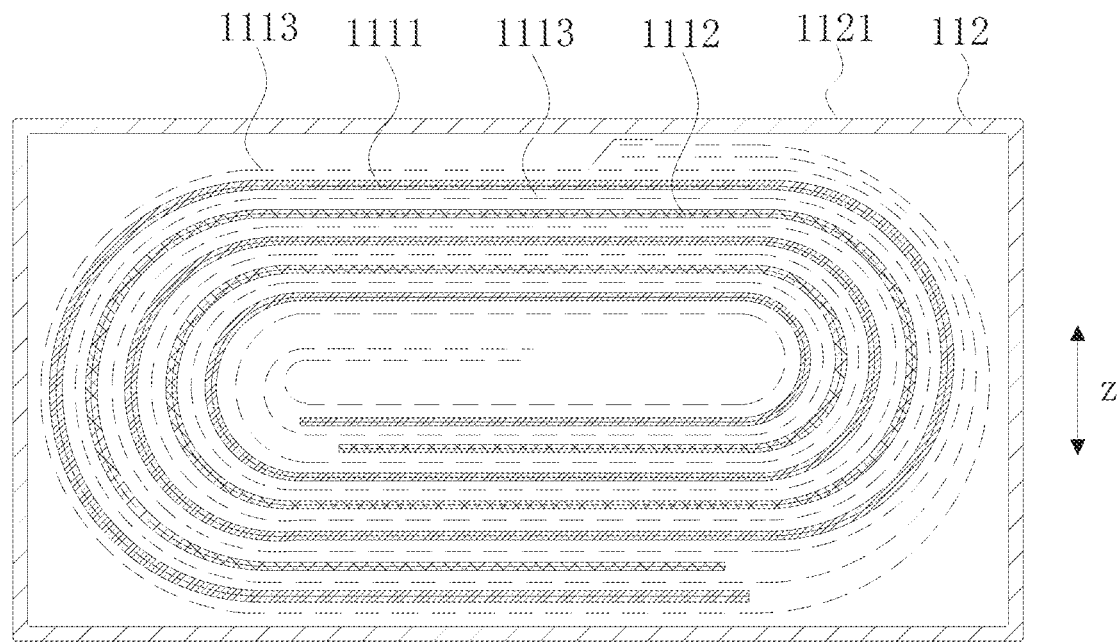
FIG. 13 is a cross-sectional view of a battery assembly in the form of a wound structure according to a specific embodiment.
Figure 14:
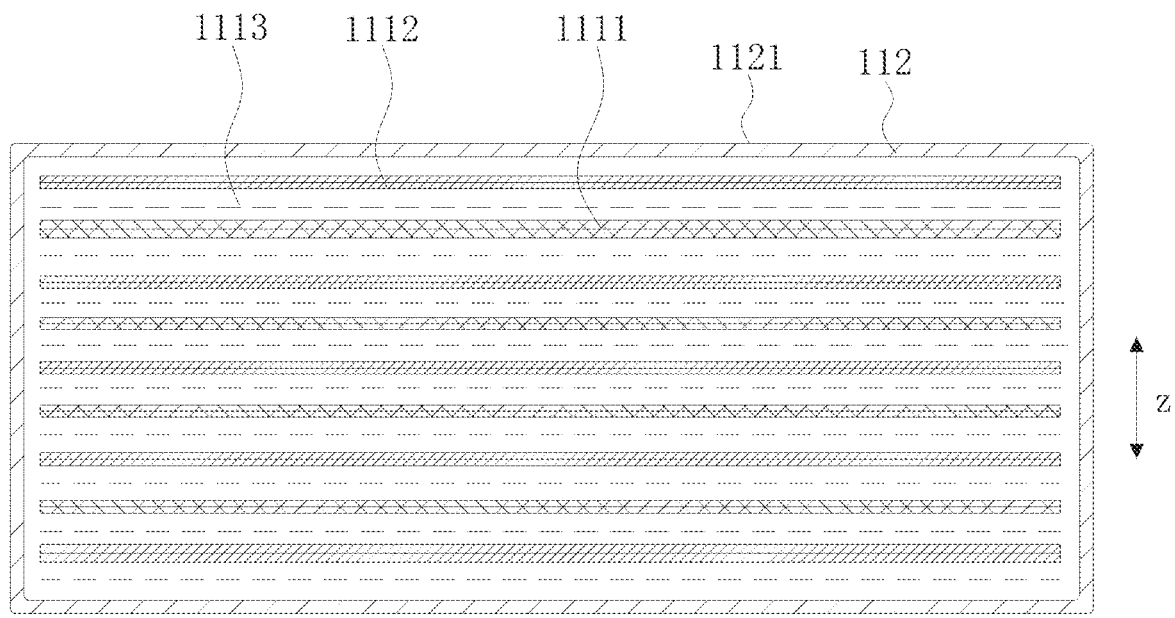
FIG. 14 is a cross-sectional view of a battery assembly in the form of a layered structure according to a specific embodiment.

When the electrode assembly 111 is in form of a wound structure, as shown in FIG. 13, the electrode assembly 111 is flat, and the outer surfaces of the electrode assembly 111 include two flat surfaces 1114. The two flat surfaces 1114 face to one another in the vertical direction (the direction indicated by arrow z). In other words, the flat surfaces 1114 face to the first surfaces 1121. The electrode assembly 111 has an approximately hexahedral form, and the flat surface 1114 is substantially parallel to a winding axis and is an outer surface having the largest area. The flat surface 1114 can be a relatively flat surface, rather than a strictly flat surface.

When the electrode assembly 111 is in form of a layered structure, as shown in FIG. 14, the first electrode plate 1111, the separator 1113, and the second electrode plate 1112 are stacked in the vertical direction (the direction indicated by arrow z), i.e., the first electrode plate 1111 face to the first surface 1121.

During a charging and discharging process, the electrode assembly 111 inevitably expands in a thickness direction of the first electrode plate 1111. In the electrode assembly 111 of the wound structure, an expansion force is greatest in a direction perpendicular to the flat surface 1114. In the electrode assembly 111 of the layered structure, the expansion force is greatest in a stacking direction of the first electrode plate 1111 and the second electrode plate 1112.

The electrode assembly 111 can adopt the wound structure or the layered structure. When the electrode assembly 111 is in form of the wound structure, the flat surfaces 1114 are located in the vertical direction (the direction indicated by arrow z). When the electrode assembly 111 is in form of the layered structure, the first electrode plate 1111 and the second electrode plate 1112 are stacked in the vertical direction (the direction indicated by arrow z). It can be seen that, whether the electrode assembly 111 adopts the wound structure or the layered structure, the maximum expansion force applied by the electrode assembly 111 on the battery casing 112 is oriented in the vertical direction.

On the contrary, in the battery unit 11 of the battery module 1 in the related art, the maximum expansion force applied by the electrode assembly 111 on the battery casing 112 is always oriented in the horizontal direction. The battery module 1 has a much greater size in the horizontal direction than that in the vertical direction. For example, due to the limitation on the height of a vehicle chassis, more battery units 11 have to be stacked in the horizontal direction, the expansion force is accumulated in the horizontal direction. In this regard, the battery module 1 is subjected to an extremely great expansion force in the horizontal direction, and it is necessary to provide very thick end plates on both sides of the battery module 1 in the horizontal direction to resist the expansion force. However, the increased thickness of the end plates can lower the energy density of the battery module 1. In the present embodiment, as the maximum expansion force applied by the electrode assembly 111 on the battery casing 112 is oriented in the vertical direction and the number of battery units 11 stacked in the vertical direction is smaller, the maximum expansion force of the battery module 1 is substantially reduced when compared with the related art.

The battery unit 11 can produce gas in the battery casing 112 during the charging and discharging process, the produced gas exerts a force on the battery casing 112, thereby intensifying the expansion of the battery casing 112. In the present disclosure, as the first surface 1121 has a larger area than the second surface 1122 and the two first surfaces 1121 of the battery unit 11 are opposite to each other in the vertical direction, the maximum force applied by the produced gas on the battery casing 112 is also oriented in the vertical direction. Compared with the related art, the maximum expansion force of the battery module 1 is further reduced.

It should be understood that the embodiments according to the present disclosure discussed above are merely illustrative embodiments, but not intended to limit the present disclosure. The technical solution according to the present disclosure can be modified or changed in various manners. Based on the description or the accompanying drawing, any modifications, equivalent replacements, improvements, and direct or indirect applications in other related arts should fall within the scope of protection of the present disclosure.

What is claimed is:

1. A battery module (1), comprising:
a plurality of battery unit array structures (10), each of the plurality of battery unit array structures (10) comprising a plurality of battery units (11) and a plurality of busbars (12) electrically connected to the plurality of battery units (11);
a first cover body (13);
a second cover body (14),
wherein the first cover body (13) is connected to the second cover body (14), and the plurality of battery unit array structures (10) is arranged between the first cover body (13) and the second cover body (14),
the first cover body (13) comprises a first carrying portion (131) and a second carrying portion (132), and the first carrying portion (131) and the second carrying portion (132) is in a split structure,
the plurality of battery unit array structures (10) includes a first battery unit array structure (101) and a second battery unit array structure (102), and
the first battery unit array structure (101) is disposed opposite to the first carrying portion (131), and the second battery unit array structure (102) is disposed opposite to the second carrying portion (132); and
a fixing component (17), wherein the first carrying portion (131) is connected to the second carrying portion (132) through the fixing component (17), wherein the fixing component (17) is a cooling plate, and the first carrying portion (131) and the second carrying portion (132) are respectively connected to the fixing component (17) with heat-conducting glue.

2. The battery module according to claim 1, wherein each of the plurality of battery units (11) comprises a battery casing (112), a cover plate (114), and electrode terminals (115), the cover plate (114) is connected to the battery casing (112), and the electrode terminals (115) are provided on the cover plate (114) and electrically connected to the plurality of busbars (12),
the electrode terminals (115) of the first battery unit array structure (101) face towards or away from the second battery unit array structure (102), and/or the electrode terminals (115) of the second battery unit array structure (102) face towards or away from the first battery unit array structure (101).

3. The battery module according to claim 2, wherein the first carrying portion (131) comprises a first carrying surface (1311) disposed vertically, the first carrying surface (1311) is located at a side of the first battery unit array structure (101) facing away from the second battery unit array structure (102), and the electrode terminals (115) of the first battery unit array structure (101) face towards the second battery unit array structure (102), and/or
the second carrying portion (132) comprises a second carrying surface (1321) disposed vertically, the second carrying surface (1321) is located at a side of the second battery unit array structure (102) facing away from the first battery unit array structure (101), and the electrode terminals (115) of the second battery unit array structure (102) face towards the first battery unit array structure (101).

4. The battery module according to claim 1, wherein each of the plurality of battery units (11) further comprises an electrode assembly (111) accommodated in a battery casing (112), and the electrode assembly (111) comprises a first electrode plate (1111), a second electrode plate (1112), and a separator (1113) disposed between the first electrode plate (1111) and the second electrode plate (1112),
the electrode assembly (111) is in a wound structure, and outer surfaces of the electrode assembly (111) comprise two flat surfaces (1114) facing to each other in a vertical direction; or the electrode assembly (111) is in a layered structure in which the first electrode plate (1111), the separator (1113) and the second electrode plate (1112) are stacked in the vertical direction.

5. The battery module according to claim 1, wherein the plurality of battery unit array structures (10) comprises three or more battery unit array structures (10) comprising a third battery unit array structure (103), and the third battery unit array structure (103) is disposed between the first battery unit array structure (101) and the second battery unit array structure (102),
the first cover body (13) further comprises a third carrying portion (133), and the third battery unit array structure (103) is disposed opposite to the third carrying portion (133).

6. The battery module according to claim 5, wherein the third carrying portion (133) has one end fixed to the first carrying portion (131) and another end fixed to the second carrying portion (132).

7. The battery module according to claim 1, wherein the first carrying portion (131) and/or the second carrying portion (132) are glued to the plurality of battery unit array structures (10).

8. The battery module according to claim 1, wherein the first carrying portion (131) and the second carrying portion (132) are connected by welding, riveting or bonding.

9. The battery module according to claim 2, further comprising a collecting plate (15), wherein the collecting plate (15) is vertically disposed and connected to the electrode terminals (115) of each of the plurality of battery units (11).

10. The battery module according to claim 1, further comprising:
an accommodating box, wherein the battery module comprises a portion of a plurality of battery modules, wherein the plurality of battery modules is accommodated in the accommodating box.

11. The battery pack according to claim 10, wherein the first cover body (13) comprises a first fixing portion (134) and a second fixing portion (135), the first fixing portion (134) is connected to the first carrying portion (131), and the second fixing portion (135) is connected to the second carrying portion (132),
the second cover body (14) comprises a main plate (140), a third fixing portion (141) and a fourth fixing portion (142), and the third fixing portion (141) and the fourth fixing portion (142) are respectively connected to two ends of the main plate (140),
the accommodating box comprises a box cover (2) and a box body (3), the box body (3) is provided with a first fixing beam (31) and a second fixing beam (32), and the first fixing beam (31) and the second fixing beam (32) protrude from a surface of the box body (3),
the first fixing portion (134), the third fixing portion (141) and the first fixing beam (31) are disposed opposite to one another, and the first fixing portion (134) and the third fixing portion (141) are fixed to the first fixing beam (31),
the second fixing portion (135), the fourth fixing portion (142) and the second fixing beam (32) are disposed opposite to each other, and the second fixing portion (135) and the fourth fixing portion (142) are fixed to the second fixing beam (32).

12. The battery pack according to claim 11, further comprising a plurality of pressing bars (4), wherein the first fixing portion (134) and the third fixing portion (141) are pressed between one of plurality of pressing bars (4) and the first fixing beam (31), and the second fixing portion (135) and the fourth fixing portion (142) are pressed between one of plurality of pressing bars (4) and the second fixing beam (32).

* * * * *